March 31, 1925.
J. H. BURKHOLDER
VEHICLE JACK
Filed Aug. 17, 1923
1,531,732
2 Sheets-Sheet 1
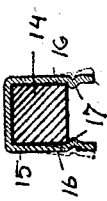
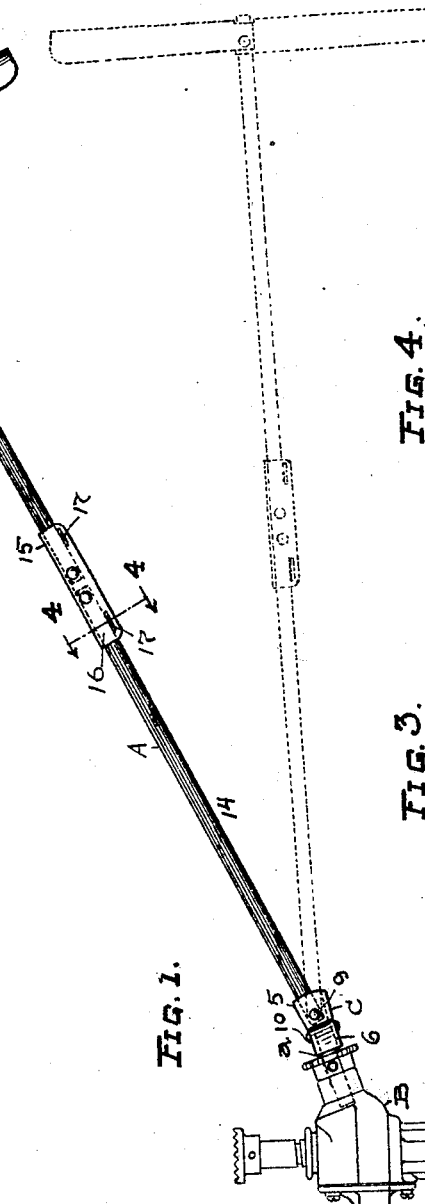
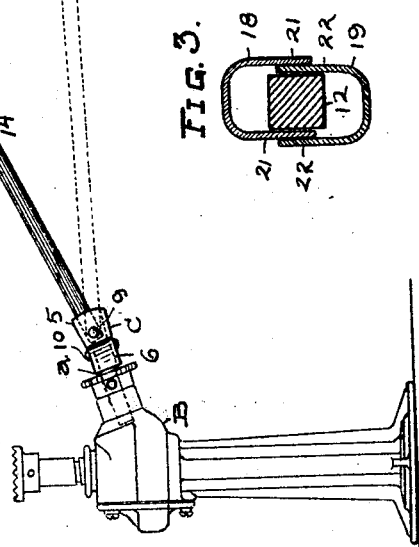
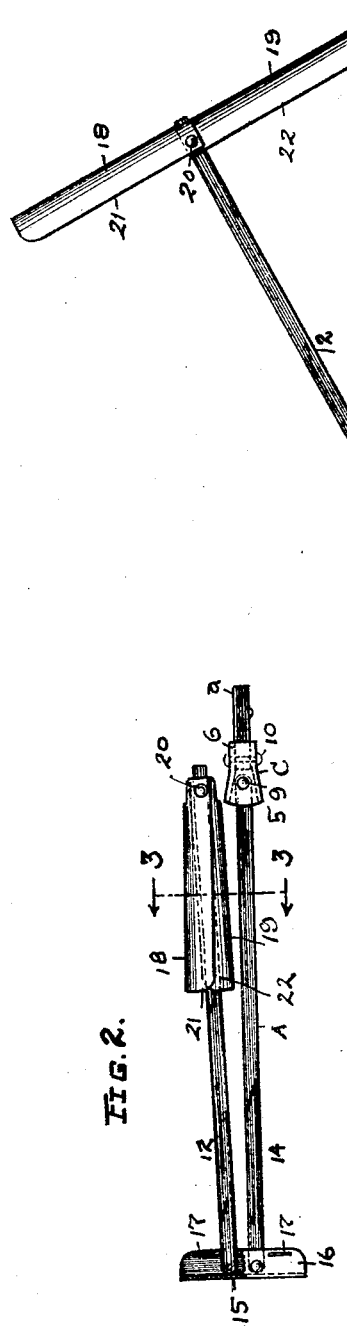
Inventor
John H. Burkholder.
By *Fisher Moser Moore*
Attorneys

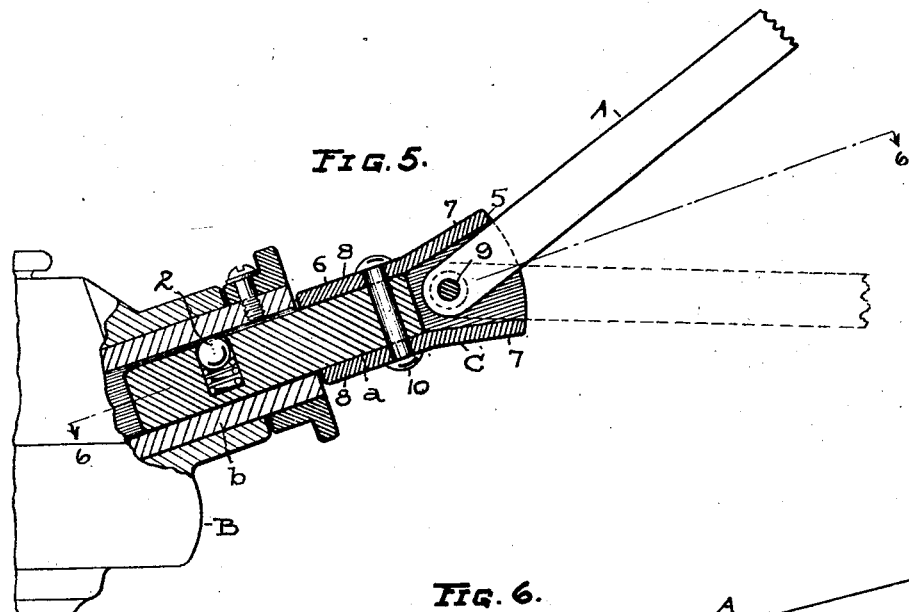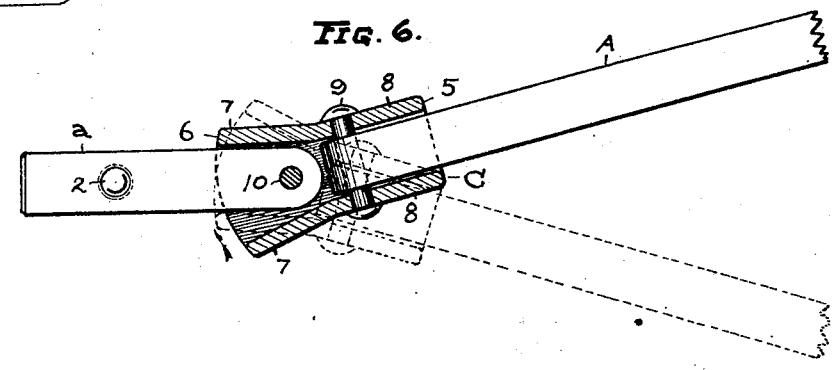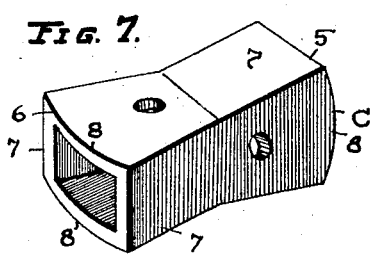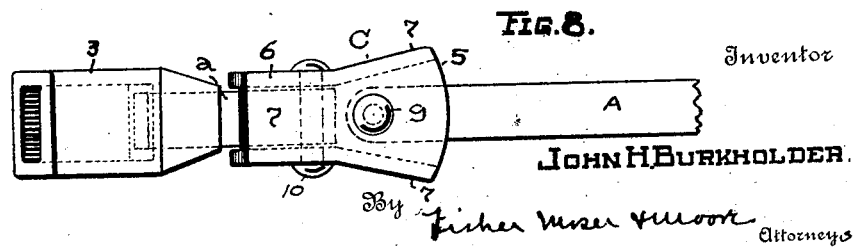

Patented Mar. 31, 1925.

1,531,732

UNITED STATES PATENT OFFICE.

JOHN H. BURKHOLDER, OF ASHLAND, OHIO, ASSIGNOR TO ELITE MANUFACTURING COMPANY, OF ASHLAND, OHIO, A PARTNERSHIP COMPOSED OF JOHN H. BURKHOLDER, P. E. COUNTRYMAN, AND E. L. KILHEFNER.

VEHICLE JACK.

Application filed August 17, 1923. Serial No. 657,943.

*To all whom it may concern:*

Be it known that I, JOHN H. BURKHOLDER, a citizen of the United States, residing at Ashland, in the county of Ashland and State of Ohio, have invented certain new and useful Improvements in a Vehicle Jack, of which the following is a specification.

My invention relates to an improvement in vehicle jacks, and more particularly in the operating handle for a jack. Thus, my general object is to provide an operating handle for a jack which may be conveniently attached and detached and which is also particularly constructed to permit the handle to be shifted to different operating positions but only within predetermined limits so that the jack may be operated from different points of advantage and also lifted and carried very readily by the handle and deposited and placed with convenience and despatch in an upright position underneath a vehicle. The handle is also made in jointed sections to permit it to be folded compactly when not in use, all as hereinafter shown and described and more particularly pointed out in the claims.

In the accompanying drawings, Fig. 1 is a reduced side view of a jack having my improved handle attached thereto and fully unfolded and extended. Fig. 2 is a side elevation of the handle folded. Fig. 3 is a cross section enlarged, of the folded handle ends on line 3—3 of Fig. 2. Fig. 4 is a cross section, enlarged, of the handle on line 4—4 of Fig. 1. Fig. 5 is an enlarged side and sectional view of a portion of a jack and my jointed handle coupled thereto. Fig. 6 is a top view of the coupling end of the handle alone, the universal joint or coupling sleeve being in section. Fig. 7 is a perspective view of the flaring coupling member or sleeve itself. Fig. 8 is a side view of the coupling end of my improved handle showing a socket extension thereon adapted to permit a detachable coupling connection to be made with the operating stud or shaft of a jack.

The invention comprises a relatively long handle A having a jointed extension —a— which is adapted to be detachably connected to the operating shaft *b* of a vehicle jack B. As shown in Fig. 1 the jack is of the lift screw type having a hollow operating shaft *b*, see Fig. 5, extending laterally therefrom and into which the square extension —a— of the handle is adapted to be inserted and removably engaged. A spring-pressed ball 2 confined within a side opening in extension —a— serves as a frictional detent for the extension and prevents too easy withdrawal. The jack may be of any other kind or type with which an operating handle may be detachably engaged, and in Fig. 8 I show extension —a— provided with a terminal socket 3 adapted to sleeve over a square or angular operating shaft such as employed in many jacks in common use. Some operating shafts are also made round and have cross pins or key ways to effect an operative union with a detachable handle, and extension —a— would in such cases be made to sit accordingly. These are minor features and capable of considerable modifications without departing from the main object of my invention, which is to provide a joint or union member C between handle A and its extension —a— whereby the handle may be shifted readily to different angular positions and at the same time be always rigidly connected to the jack to either operate, move or carry the jack. These jacks are usually placed under the axles or axle housings of a vehicle at a remote point from the end or side of the vehicle or where it may be difficult to reach and operate the jack. To meet this situation handle A is made relatively long, but in placing the jack in working position beneath the vehicle at a point remote from the outer operating end of a long handle it is difficult to set the jack upright or to hold it in a given position while adjusting the lift member of the jack to the car, particularly if a stable setting is dependent upon a grip and hold at the outer end of the long handle. This is especially true if a joint is provided which permits the handle to be moved to different angles to escape obstructions in operating the handle. I overcome these objections with my present joint or coupling member C which in its preferred form consists of a short tube or hollow body having oppositely flaring ends 5 and 6, respectively, the flare at one end being in a perpendicular plane and at the opposite end in a horizontal plane, or in planes at right angles to each other. Thus each end portion of member C has two diverging flat walls 7—7 and two straight parallel walls 8—8 forming an outwardly flaring socket of angular cross section within which the handle and its extension may be secured at their meeting ends by separate pivot pins 9 and 10 extending at right angles to each other through the parallel walls 8—8 of the flaring ends 5 and 6, respectively. Flat-sided or square bar stock is preferably used for the handle and its extension of a size to snugly fit each flaring socket between the parallel walls 8—8 and to permit a limited amount of free play between the diverging or flaring walls 7—7. In this way the main handle is adapted to rotate the extension with a limited universal movement, and when either the handle or its extension is at the limit of its free play within its respective socket the parts are in effect rigidly connected to permit the jack to be carried and moved bodily by means of the handle. The limit of movement of handle A within coupling member C in a vertical plane is indicated by the full and dotted lines of the handle in Fig. 1, but it should also be understood that the free play of extension B within coupling member C permits corresponding angular shift of the handle to be obtained in a horizontal plane.

As shown, handle A is made of hinged sections adapted to be compactly folded. Thus handle A comprises two bars 12 and 14 which are pivotally connected at their meeting ends to the middle of a short section 15 made of spring steel or sheet metal bent into channel or U-shape to permit the bars to be folded snugly between the spring sides or flanges 16—16 of this section, and inwardly-extending ribs or indentations 17—17 near the end edges of the flanges effect locking of the bars when these parts are unfolded and extended as appears in Fig. 1. The outer end of the handle is provided with foldable hand gripping sections 18 and 19 hinged or pivotally connected at their meeting ends by a pivot pin 20 to the outer end of bar 14. These gripping sections are also channeled or of U-shape in cross section and the flanges 21 of one section are offset or overlap the flanges of the other section to permit a single pivot pin 20 to be used in connecting them together and to permit one gripping section to be folded within the other in enclosing relation to bar 14, see Figs. 2 and 3.

I have shown and described in this application my preferred form and construction of a foldable jack handle, but do not altogether limit my claims to this exact construction, as I desire to include any equivalent device and means or operating combination which will provide a universal movement in a jack handle and permit the coupling parts thereof to become rigid under carrying conditions, thus permitting the jack to be carried bodily in the same way as if a rigid one-piece handle were used for the jack. Obviously, a rigid handle is very advantageous in handling and setting the jack, and a universal movement in the handle is useful in operating the jack from different points or stations after the jack is placed or set.

What I regard as my invention or discovery, and desire to claim, is:

1. A vehicle jack having an operating handle provided with a universal joint in which definitely fixed stops are provided at right angles in opposite ends thereof to permit the handle to be placed obliquely either vertically or horizontally in rigid supporting connection with the jack.

2. An operating handle having an extension adapted to be detachably connected with an operating part of a vehicle jack, said handle and extension being coupled together for universal movement, and the coupling having separate limiting stop means for said handle and extension, respectively, adapted to permit either or both the handle and extension to be set in rigid angular relation and connection in different planes.

3. An operating handle for a vehicle jack, comprising a relatively long shaft, a short extension for said shaft adapted to permit a detachable connection to be made with an operating part of said jack, and a universal coupling for said shaft and extension having stop portions in different planes adapted to limit the movement of the handle.

4. An operating handle for a vehicle jack, comprising a shaft and an extension therefor and a tubular coupling member having flaring sockets adapted to confine the meeting ends of said shaft and extension.

5. An operating handle for a vehicle jack, comprising a pair of handle sections and a tubular coupling member therefor formed with flaring sockets at its opposite ends and provided with pivot pins for said sections within the base-ends of said sockets.

6. An operating handle for a vehicle jack, comprising a pair of handle sections, and a tubular coupling member having sockets of flaring shape arranged in different angularly-related planes at opposite ends thereof, said handle sections being pivoted at their meeting ends within said sockets.

7. An operating handle for a vehicle jack, comprising a square shaft having a separate extension, and a tubular coupling member for said shaft and extension having flat-sided sockets of flaring shape adapted to receive the meeting ends of said shaft and extension, and pivot pins for said shaft and extension extending at right angles to each other through said sockets.

In testimony whereof I affix my signature hereto.

JOHN H. BURKHOLDER.